No. 896,572. PATENTED AUG. 18, 1908.
O. PEPPER.
MOTOR.
APPLICATION FILED NOV. 13, 1907.
2 SHEETS—SHEET 2.
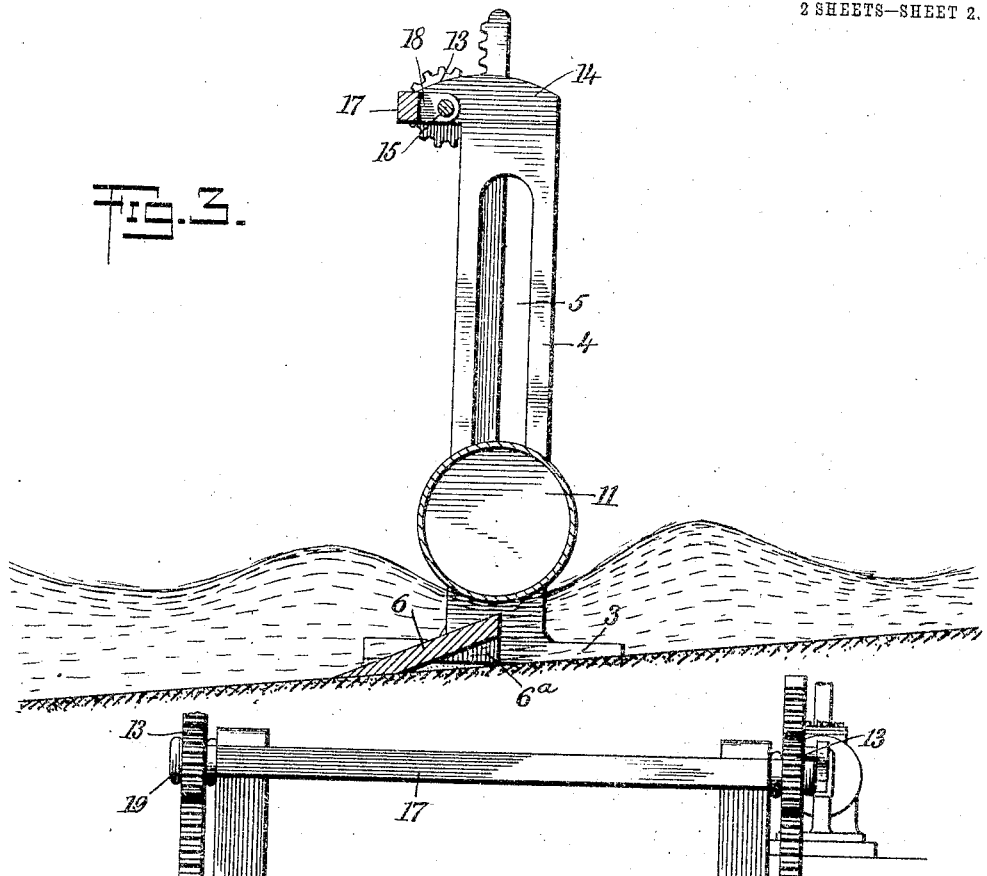
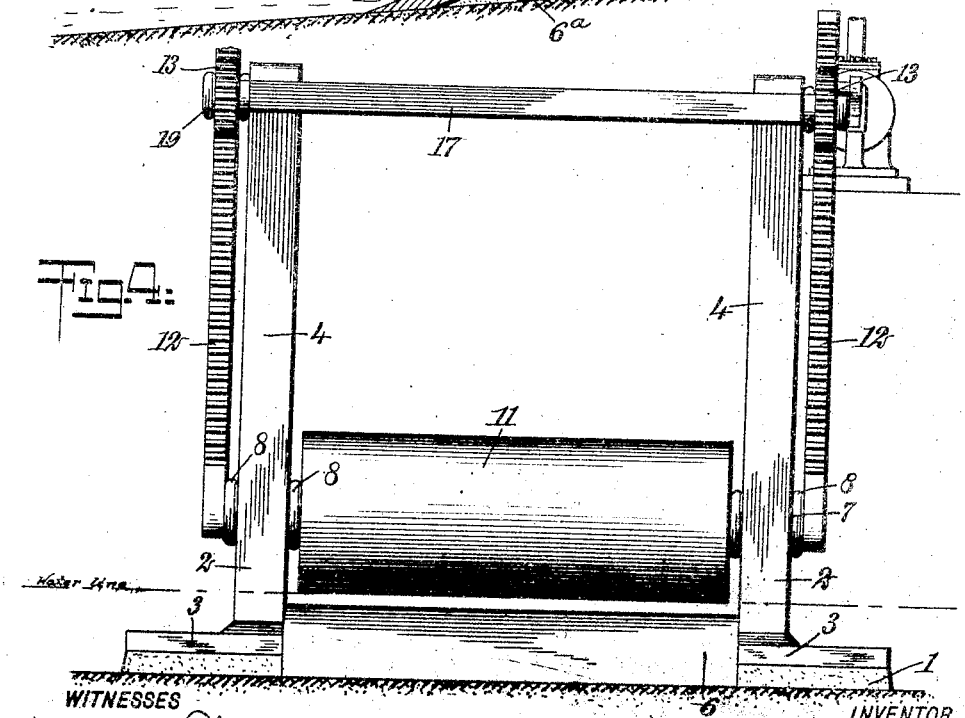
WITNESSES
G. Robert Thomas
INVENTOR
Oscar Pepper
BY
ATTORNEYS

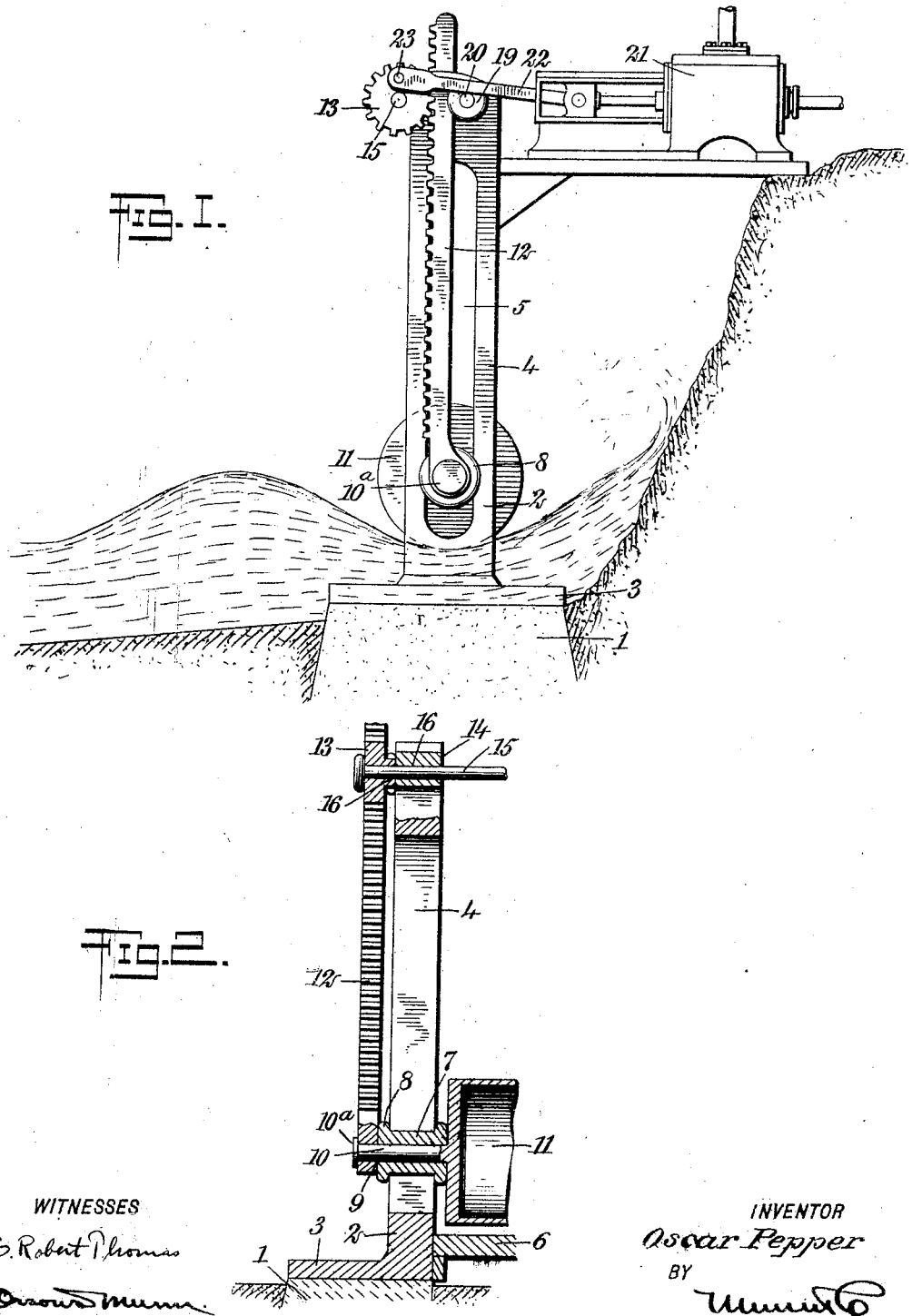

UNITED STATES PATENT OFFICE.

OSCAR PEPPER, OF SAN FRANCISCO, CALIFORNIA.

MOTOR.

No. 896,572.

Specification of Letters Patent.

Patented Aug. 18, 1908.

Application filed November 13, 1907. Serial No. 401,953.

*To all whom it may concern:*

Be it known that I, OSCAR PEPPER, a citizen of the United States, and a resident of San Francisco, in the county of San Francisco and State of California, have invented a new and Improved Motor, of which the following is a full, clear, and exact description.

This invention relates to motors, and more particularly to motors for utilizing the energy generated by moving water.

An object of the invention is to provide a device of the class described, whereby the movement of water can be utilized for generating power.

A further object is to provide a motor serving for the utilization of wave or other movements of bodies of water to produce power, and having means for directing the waves to augment their effect upon the motor.

A still further object of the invention is to provide a wave motor constructed automatically to adjust itself to varying tide levels.

The invention consists in the construction and combination of parts to be more particularly described hereinafter and particularly set forth in the claims.

Reference is to be had to the accompanying drawings forming a part of this specification, in which similar characters of reference indicate corresponding parts in all the figures, in which Figure 1 is a side elevation of the device and shows a method of deriving power therefrom; Fig. 2 is a longitudinal section of one of the standards of the motor, showing parts broken away; Fig. 3 is a transverse sectional view of the device; and Fig. 4 is a front elevation of the motor.

Before proceeding to a more detailed description of my invention, it should be understood, that while my invention is particularly useful as a wave motor, it can also be advantageously employed for the production of power from other movements reciprocatory or irregular, of bodies of water. Underneath the motor float, I provide an inclined platform which directs the waves or other movements of the water, in such a manner that the efficiency of the action with respect to the motor float, is greatly increased. The rise and fall of the tide does not affect the device, as the float is suitably mounted to assume automatically a plurality of positions without affecting its operation.

Referring more particularly to the drawings, 1 represents supports or piers of concrete, stone, or other suitable material, upon which are mounted substantially parallel standards 2. These standards are fashioned from any suitable material such as iron, steel, or the like, and have bases 3, which are securely mounted upon the supports 1. The standards have sides 4, forming therebetween, slots 5.

Movably mounted within the slots 5 of the standards are rollers 7, having suitable flanged ends 8. The rollers have longitudinal bores 9. Situated between the standards, and having spindles 10 arranged within the bores 9 in the rollers, is a float 11 preferably cylindrical in form and fashioned from any suitable material such as wood, metal, or the like. The spindles 10 extend beyond the rollers at the outer ends thereof and carry substantially similar rack bars 12 having near the lower ends, openings to receive the spindles. The spindles have heads $10^a$ which are laterally extended and serve to hold the rack bars in place. Upon the standards 2 are head members 14, having transverse openings 16, in which is journaled a shaft 15. The extended ends of the latter carry gear wheels 13, each of which is in mesh with one of the rack bars 12. A cross support 17, is secured to the head members 14 of the standard, and serves to hold the latter in rigid position in respect to one another. A bearing bracket 18, for supporting the shaft 15 intermediate of the ends thereof, is mounted upon the cross support 17. Rollers 19 having flanged ends, are revolubly mounted upon the head members 14 by means of pins 20, and serve to guide the rack bars 12 and hold them in position, thereby preventing the disengagement of the gear wheels and rack bars.

Suitable means for producing power may be attached to the wheels 13, as for instance as is shown in the accompanying drawings, in which 21 represents a reciprocatory machine having the connecting rod 22 secured to one of the gear wheels 13 by means of a crank pin 23. An inclined platform 6 is mounted upon the standards and rests upon brackets $6^a$ of the same. It serves to direct the movement of the water and thereby increases the upward pressure of the same between the platform and the base of the float and tends to raise the latter irrespective of the float's buoyancy.

Having thus described my invention, I claim as new and desire to secure by Letters Patent:

1. In a wave motor, a float operated by the water movements, and immovable means under said float for increasing the upward pressure of the water under said float.

2. In a wave motor, a movable float operated by the water movements, members movable by said float and adapted to be connected with power utilizing means, and immovable means under said float for increasing the upward pressure of the water under said float.

3. In a device of the class described, separated standards, said standards having longitudinal slots, a rotatable float mounted between said standards, rollers mounted in said slots and supporting said float, rack bars mounted upon said rollers and movable therewith, further rollers at the upper ends of said standards for guiding said bars, gear wheels mounted at said upper ends of the standards and engaging with said rack bars, and inclined means between said standards for directing the water movements.

4. In a device of the class described, separated standards, said standards having slots, a rotatable float mounted between said standards, rollers mounted in said slots and supporting said float, members having racks and mounted upon said rollers and movable therewith, further rollers for guiding said members, gear wheels mounted upon said standards and engaging with said racks, and inclined fixed means between said standards for directing the water movements.

5. In a wave motor, an adjustable float operated by the water movements, members controlled by said float and adapted to be connected with power utilizing means, and an inclined platform immovably mounted under said float for increasing the water movements.

6. In a wave motor, separated standards, an adjustable float arranged between said standards and operable by the water movements, members movable with said float and adapted to be connected to a power utilizing mechanism, and an immovable inclined platform under said float and secured to said standards for increasing the water movement.

In testimony whereof I have signed my name to this specification in the presence of two subscribing witnesses.

OSCAR PEPPER.

Witnesses:
F. L. TURPIN, Jr..
F. L. TURPIN.